Nov. 8, 1932.  H. T. SEELEY  1,886,749

CONTROL APPARATUS

Filed Feb. 16, 1932

Inventor:
Harold T. Seeley,
by Charles V. Tullar
His Attorney.

Patented Nov. 8, 1932

1,886,749

UNITED STATES PATENT OFFICE

HAROLD T. SEELEY, OF LANSDOWNE, PENNSYLVANIA, ASSIGNOR TO GENERAL ELECTRIC COMPANY, A CORPORATION OF NEW YORK

CONTROL APPARATUS

Application filed February 16, 1932. Serial No. 593,249.

My invention relates to improvements in control apparatus for controlling the interconnection of alternating current circuits and more particularly to apparatus for effecting the interconnection of the circuits when their electromotive forces have substantially the same frequency and magnitude and are in phase. My invention further relates to improvements in control apparatus of the type disclosed in United States Letters Patent 1,680,754 and 1,680,765 which disclose control apparatus for effecting the interconnection of two alternating current circuits only when the correct electrical relations prevail. These relations are substantial identity in the frequencies and phase and preferably in the magnitures of the electromotive forces of the circuits. Such relations or conditions must in effect be anticipated by the control apparatus in order to allow for the time of the closing operation of the interconnecting switch. Since the time for a correct interconnection is a very important factor, particularly when it is necessary to get a machine on the bus in a hurry, it is very desirable to be able to take advantage of every possible opportunity to effect the interconnection. An object of my invention is to provide improved control apparatus whereby to obviate certain difficulties inherent in mechanical devices and to utilize to the best advantage every opportunity for interconnection.

My invention will be better understood from the following description when considered in connection with the accompanying drawing and its scope will be pointed out in the appended claims.

Figure 1:
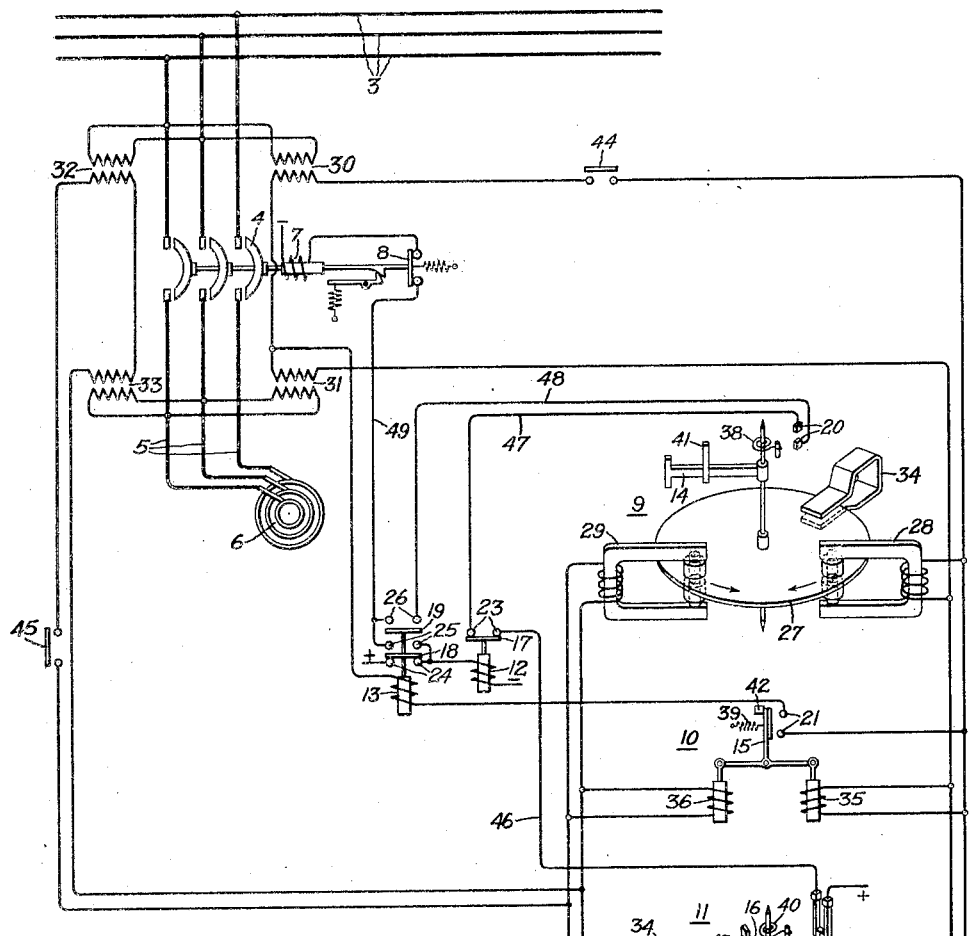
Figure 2:
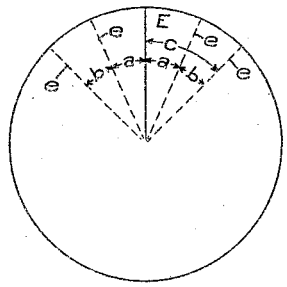

In the accompanying drawing, Fig. 1 illustrates an embodiment of my invention in control apparatus for interconnecting two alternating current electric circuits when the correct electrical conditions prevail and Fig. 2 is a vector diagram explanatory of the operation of the embodiment of my invention shown in Fig. 1.

For the purpose of illustrating my invention, I have shown in Fig. 1 an embodiment thereof as applied to a three-phase alternating current electric system including an alternating current circuit, such as a bus 3, to which may be connected by any suitable circuit controlling or switching means 4 another alternating current circuit 5 herein shown as including an alternator 6. The switching means 4 is shown as of the latch-closed type and includes a closing coil 7 in the circuit of which, for the purpose of relieving other more delicate contacts, is included a circuit breaker auxiliary switch 8, closed when the circuit breaker is open and vice versa.

For controlling the switch 4 so as to start the closing operation thereof in time to effect closure if the electromotive forces of the circuits 3 and 5 are substantially alike in phase and frequency, I provide electroresponsive means controlled in accordance with the phase difference and the difference between the frequencies of the electromotive forces of the circuits 3 and 5 so that the closing operation of the switch 4 is started at a predetermined phase difference either when the frequency difference is less than a predetermined value or when the frequency difference is within a predetermined range if more precise synchronizing is desirable. The electroresponsive means shown include a plurality of differential means 9 and 10 and in some cases a differential means 11, a control means 12 and a transfer means 13. These electroresponsive means, shown as relays, are arranged respectively to control a plurality of circuit controlling members, such as movable contacts 14, 15, 16, 17, and 18 and 19, which in order to start the closing operation of the switch 4 must be in predetermined positions. These circuit controlling members control contacts 20, 21, 22, 23, 24, 25, and 26 respectively. The contacts 24 are in the circuit of the energizing winding of the control relay 12 so that when the transfer relay 13 is in one position the deenergized position as shown the control relay is energized to close its contacts 23.

The differential relay 10 is connected to be energized to move its circuit controlling member in accordance with the phase relation of the electromotive forces in the circuits 3 and 5 and the differential relays 9 and 11 are connected to be energized to move their circuit controlling members 14 and 16 respectively in accordance with the difference between the frequencies of the electromotive forces of the circuits 3 and 5. The energization of the transfer relay 13 is controlled in accordance with the phase relation between the electromotive forces of the circuits and for this purpose the circuit of this relay includes the contacts 21 of the phase difference responsive relay 10. The control circuit or circuit of the closing coil 7 includes in addition to the auxiliary switch 8 the contacts 26, 20, 23 and 22 in series so that all these contacts must be simultaneously closed in order to insure the starting of the closing operation of the switch 4.

In order to maintain the control relay 12 in its controlling position with the contacts 23 closed, when the transfer relay 13 moves to its other or energized position to close contacts 25 and 26 and only when the correct frequency difference exists between the electromotive forces of the circuits 3 and 5, the circuit of the control relay includes in series contacts 25, 26, 20, 23 and 22. Thus, even through the correct phase relation may exist to cause the operation of the phase difference relay 10 and thereby the energization of the transfer relay 13, the control circuit of the closing coil 7 will not be completed unless the frequency difference is less than a predetermined value sufficient to cause the closing of contacts 20 of relay 9 and not less than a smaller predetermined value which would cause the opening of the contacts 22. It will be observed that, since contacts 20 and 22 are in series in the circuit of the control relay 12 when the transfer relay 13 is energized, the control relay will be deenergized if either of the contacts 20 and 22 are open. The time lag of the control relay 12 is such that this relay remains in its energized position during the movement of the transfer relay 13 from its deenergized position to its energized position. This time lag is comparatively small and may be obtained by suitable design with respect to the inertia of the parts or by any other means examples of which are well known to the art.

As illustrated, the relays 9 and 11 are of of the induction disk type, each including a disk 27 with which are inductively associated electromagnetic shaded pole motor elements 28 and 29 respectively arranged to exert opposing torques as indicated by the arrows adjacent their poles. The motor elements 28 and 29 are respectively connected to be energized in accordance with the vector sum of and the vector difference between the electromotive forces of the circuits 3 and 5. One way in which this can be done is to connect their windings to series cumulative potential transformers 30, 31 and series opposed potential transformers 32, 33 which are connected on opposite sides of the switch 4, as shown.

With this arrangement for the energization of the motor elements 28 and 29 and with suitable damping means such as permanent drag magnets 34, the movement of the disks is such as to prevent closing of the contacts 20 unless the frequency difference is less than a predetermined value and opening of the contacts 22 unless the frequency difference is greater than a smaller predetermined value. As shown, the phase difference responsive differential relay 10 has its windings 35, 36 connected to be energized in accordance with the vector sum of and the vector difference between the electromotive forces of the circuits 3 and 5. Each of the differential relays 9, 10 and 11 may be provided with suitable biasing means such as springs 38, 39 and 40 respectively which tend to move their respective circuit controlling members to the positions shown in the drawing against suitable stops 41, 42, 43. As shown, the transfer relay 13 is in a circuit across the potential transformer 30 through the contacts 21 of the phase difference relay 10 although any other suitable source of current may be used. In order that the control apparatus including the relays 9, 10, 11 and 13 may not be continuously energized, switches 44, 45 may be provided in the potential transformer energizing circuits to be operated either manually or automatically in response to predetermined conditions as is known to the art.

The operation of the apparatus shown in Fig. 1 will be better understood in conjunction with the vector diagram shown in Fig. 2. This diagram shows various phase relations between the electromotive force E of the bus 3 and the electromotive force $e$ of the alternator 6. While the vectors E and $e$ really are rotating vectors, E at a uniform velocity and $e$ at a variable velocity assumed to be controlled so as to approach the velocity of E, the vector E may be considered as stationary at the in-phase position for simplicity and the vector $e$ rotating relatively to the vector E. The vectors E and $e$ are also shown equal as it is assumed that suitable voltage control means are provided to take care of this feature. It will, of course, be understood that, if desirable, I may provide an additional control operative in response to the relative values of the electromotive forces of the bus 3 and the alternator 6. Examples of such means are well known in the art, one suitable means being disclosed in Letters Patent Re. 16,540. Such additional control which may comprise further contacts in the control circuit or in the circuit of the transfer relay is desirable where the circuits are to be connected only when their electromotive forces are substantially equal in value.

Assuming the parts positioned as shown in Fig. 1, that the switches 44 and 45 are closed in any suitable manner and that the phase angle between the alternator and bus voltages e and E respectively is decreasing, then at some angle a the phase relation is such that the phase difference relay 10 quickly closes its contacts and effects the energization of the transfer relay 13. If the phase angle between the voltages e and E decreased gradually to a over a range indicated by the angle b or, in other words, the frequency difference is below a predetermined value, the frequency difference relay 9 will have closed its contacts 20. If the frequency difference is not less than a smaller predetermined value, the frequency difference relay 11 will not have opened its contacts 22. The circuit of the closing coil 7 is then completed as follows: From plus, contacts 22, conductor 46, contacts 23, conductor 47, contacts 20, conductor 48, contacts 26, conductor 49, auxiliary switch 8 and closing coil 7 to minus whereby to close the circuit breaker. The control relay 12 is maintained energized through a circuit from plus, contacts 22, conductor 46, contacts 23, conductor 47, contacts 20, conductor 48, contacts 26 and 25, and relay 12 to minus since the time lag of the relay 12 is sufficient to permit the relay 13 to open its normally closed contacts 24 and close its normally open contacts 25 and 26 without the relay 12 dropping out.

If the phase angle between e and E had decreased rapidly over the angle b, the contacts 20 of the frequency difference relay 9 would not be closed when the phase difference relay 10 effected the energization of the transfer relay 13 and no circuit would be completed to maintain the control relay 12 energized. Consequently, this relay would drop out and a subsequent closure of contacts 20 would have no effect.

When the phase angle between the voltage e and E exceeds a value which is indicated by the angle c and which may be the same as a+b, the phase difference relay 10 opens its contacts 21 and thereby deenergizes the transfer relay 13. No circuit is completed for the closing coil 7 since the normally open contacts 25 and 26 of the relay 13 between the circuits of control relay 12 and the closing coil 7 open before the normally closed contacts 24 of relay 13 close. Upon the closing of contacts 24, the control relay 12 is again energized and prepared for another connecting or synchronizing operation.

From the foregoing it will be noted that if the machine voltage e passes through the zero phase position too fast for a synchronizing operation but reverses at any position beyond that indicated by the angle c on the other side, all the relays 9, 10, 11, 12 and 13 will be positioned as shown in the drawing. Consequently, a synchronizing operation will take place at the angle a as before but going in the opposite direction. In general, it is improbable that, if the frequency difference is zero at the angle c and the vector e reverses, the frequency difference on returning to angle a would be an excessive value. This possibility of synchronizing on short return swings of the vector e or rather the voltage which it represents if of considerable value in reducing the time required for a synchronizing operation, especially when an erratic machine is involved since the best available voltage phase positions of such a machine are likely to be those where the voltage rotation has reversed at some point near the inphase position and, therefore, goes through this position more slowly than if it had reversed at some point far from the zero position.

It will also be noted that a closing indication will be given only when the phase angle between E and e is a and is decreasing, the phase angle has been greater than c since the last previous time when it was less than a, and the time over the angle c—a is less than a predetermined value and, if desired, greater than a smaller predetermined value.

While I have shown and described my invention in considerable detail, I do not desire to be limited to the exact arrangement shown but seek to cover in the appended claims all those modifications that fall within the true spirit and scope of my invention.

What I claim as new and desire to secure by Letters Patent of the United States, is:

1. In combination, two alternating current circuits, means for controlling the interconnection of said circuits including control means operable to a predetermined position when energized, means connected to be energized from said circuits in accordance with the difference between the frequencies of the electromotive forces of the circuits, transfer means operable in one position to effect the energization of said control means and in another position to control the energization of said control means conjointly with said frequency difference means, the time lag of said control means being such that the control means remains in its energized position during the movement of the transfer means between its two positions and means for controlling the transfer means in accordance with the phase relation between the electromotive forces of the circuits.

2. In combination, two alternating current circuits, means for controlling the interconnection of said circuits including a control circuit and means for controlling said control circuit including means for effecting a connection in said control circuit when the difference between the frequencies of the electromotive forces of said alternating current circuits is less than a predetermined value, control means for effecting another connection in said control circuit, transfer means operable to a plurality of controlling positions to control said control means and in one of said positions to effect a connection in said control circuit and means for controlling said transfer means connected to said alternating current circuits to be operated in accordance with the phase relation between the electromotive forces of the circuits.

3. In combination, two alternating current circuits, means for controlling the interconnection of said circuits including a control circuit and means for controlling said control circuit including means connected to said alternating current circuits to be operated in accordance with the difference between the frequencies of the electromotive forces of the alternating current circuits, transfer means operable to a plurality of controlling positions, means for controlling said transfer means connected to said alternating current circuits to be operated in accordance with the phase relation between the electromotive forces of the circuits and means controlled by said transfer means when the transfer means is in one controlling position and conjointly by said frequency difference means and said transfer means when the transfer means is in another controlling position.

4. In combination, two alternating current circuits, means for controlling the interconnection of said circuits including a control means operable to a predetermined controlling position, means connected to be energized from said circuits in accordance with the difference between the frequencies of the electromotive forces of the circuits, transfer means operable in one position to effect the movement of said control means to its predetermined controlling position and in another position to control the positioning of said control means conjointly with said frequency difference means, the time lag of said control means being such that the control means remains in its predetermined controlling position during the movement of said transfer means between its two positions, and means for controlling said transfer means in accordance with the phase relation between the electromotive forces of the circuits.

5. In combination, two alternating current circuits, means for controlling the interconnection of said circuits including a control circuit and means for controlling said control circuit including control means for effecting a connection in said control circuit, means for effecting another connection in said control circuit when the difference between the frequencies of the electromotive forces of said alternating current circuits is less than a predetermined value, means for effecting an opening in said control circuit when the difference between the frequencies of the electromotive forces of the alternating current circuits is less than a smaller predetermined value, transfer means operable to one position for controlling said control means and to another position for controlling said control means conjointly with both of said frequency difference means and for effecting a connection in said control circuit, and means for controlling said transfer means connected to said alternating current circuits to be operated in accordance with the phase relation between the electromotive forces of the circuits.

In witness whereof, I have hereunto set my hand.

HAROLD T. SEELEY.